March 26, 1957  E. N. CONNOY  2,786,970
MAGNETIZING AND DEMAGNETIZING APPARATUS
Filed July 9, 1953
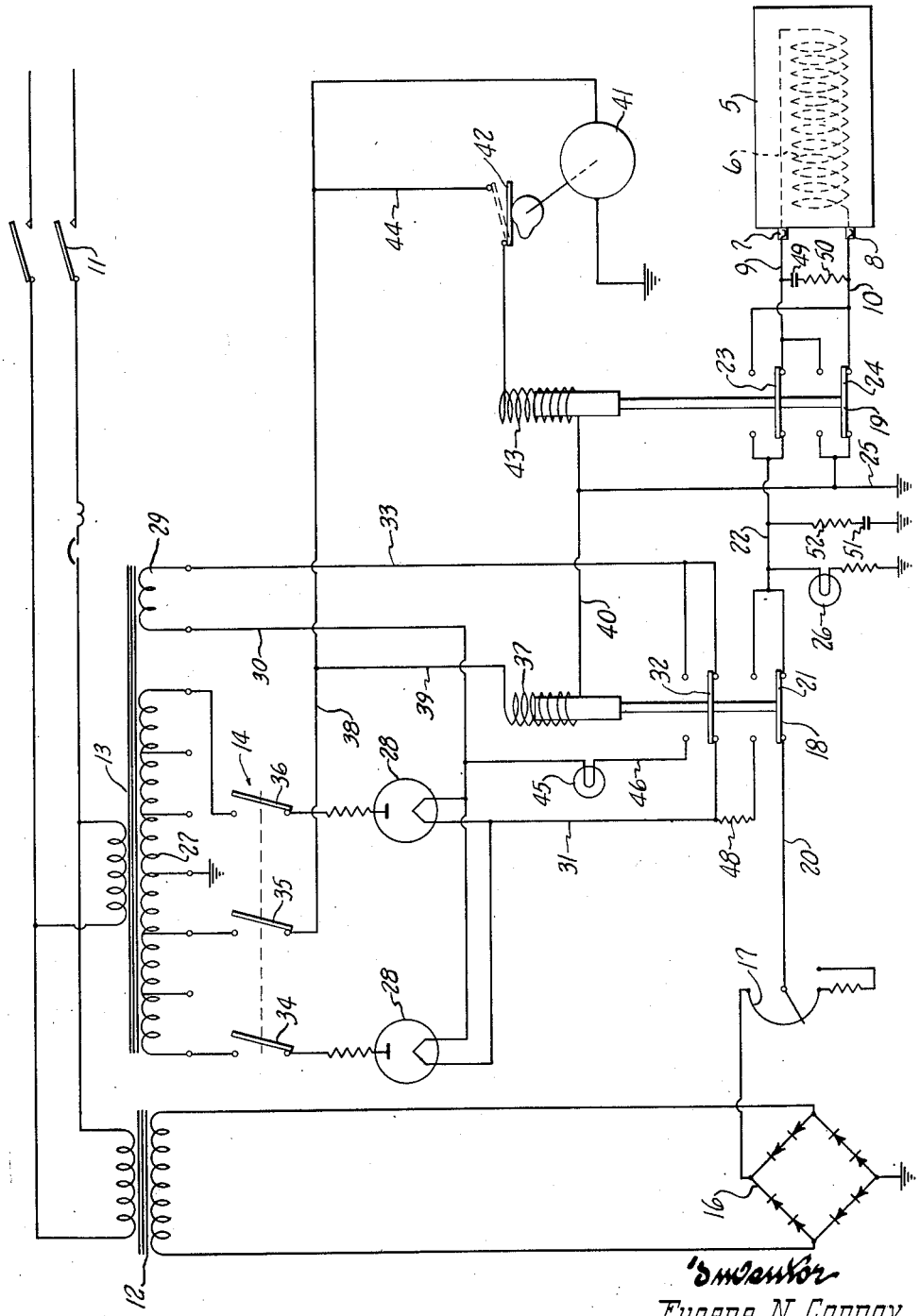
Inventor
Eugene N. Connoy
By Ira Shelton Jones
Attorney

United States Patent Office 2,786,970
Patented Mar. 26, 1957

2,786,970

MAGNETIZING AND DEMAGNETIZING APPARATUS

Eugene N. Connoy, Minneapolis, Minn., assignor to Continental Machines, Inc., Savage, Minn., a corporation of Minnesota Application July 9, 1953, Serial No. 366,923

6 Claims. (Cl. 317—123)

This invention relates to magnetizing and demagnetizing apparatus and refers more particularly to an apparatus especially adapted for use in magnetizing and demagnetizing electromagnetic chucks of the kind used for holding ferrous metal parts during milling, grinding or other similar machine operations.

As is well known such chucks are magnetized by energizing their magnet coils with a suitable direct current, and to demagnetize them and dissipate residual magnetism in the chuck and the work piece held thereby the coils of the chuck are connected with a source of gradually diminishing alternating current. Automatic demagnetizing devices capable of supplying diminishing current impulses of successively opposite polarity are well known and in regular commercial use. Patent No. 2,229,104 issued January 21, 1941, to Leo F. Littwin is an example of this type of demagnetizing equipment.

Demagnetizing apparatus has also been available for some time wherein the source of the demagnetizing current is provided by high vacuum type thermionic tubes supplying unidirectional pulsating current, the polarity of which is regularly and intermittently reversed by a suitable reversing switch mechanism. Often the same rectifier tubes are also used through appropriate circuits to provide the magnetizing current.

Selenium type rectifiers can be used to provide the magnetizing current but unlike a high vacuum hot cathode tube such as the 5U4G the dry plate type rectifier is incapable of diminishing the current it delivers. Hence, when a selenium type rectifier is employed to provide the source of demagnetizing current a rheostat must be provided which is capable of handling the full output of the rectifier. This calls for a large costly piece of apparatus; and in addition the polarity reversing switch must be capable of handling heavy loads. The cost of this equipment and also its size are matters of no small concern, and accordingly the selenium type rectifier is not as desirable as the tube type rectifier for the demagnetizing power supply.

On the other hand there is a definite advantage in using a selenium type rectifier for magnetizing the larger chucks which draw 300 or more watts, since to supply the magnetizing current for such large chucks with conventional rectifier tubes such as the 5U4G would require a relatively large bank of tubes arranged in parallel.

A control unit in which a selenium type rectifier provides the magnetizing current and a tube type rectifier supplies demagnetizing current would utilize the advantages of both, but since it has always been thought that to effect demagnetization the tube or tubes themselves would have to deliver a current at least equal to that used to magnetize the chuck, no advantage was seen in combining the two types of rectifiers. For this reason it has been customary heretofore to use the tube type rectifier to supply both the magnetizing and the demagnetizing current, and this means that in high capacity units many tubes had to be used.

The present invention obviates the need for such multiplicity of tubes and thus for the first time makes it possible to advantageously combine a dry plate type rectifier with a tube type rectifier in a control unit supplying both magnetizing and demagnetizing current. In fact this invention makes possible demagnetization of 300 and 500 watt chucks with the output of a single pair of 5U4G tubes providing full wave rectification, and without overloading the tubes or incurring the danger of ionization and consequent behavior as a cold cathode rectifier.

This objective is attained through the use of a novel circuit employing capacitance and resistance so connected that the discharge of the capacitor augments the current delivered by the tube, and in conjunction with the resistance prevents excessive voltage surges which if not properly suppressed cause ionization of the high vacuum tubes and their resultant behavior as cold cathode rectifiers.

With the above and other objects in view, which will appear as the description proceeds, this invention resides in the novel construction, combination and arrangement of parts substantially as hereinafter described and more particularly defined by the appended claims, it being understood that such changes in the precise embodiment of the hereindisclosed invention may be made as come within the scope of the claims.

The accompanying drawing illustrates one complete example of the physical embodiment of the invention constructed according to the best mode so far devised for the practical application of the principles thereof, and in which the single figure is a wiring diagram of a complete magnetizing and demagnetizing unit constructed in accordance with this invention.

Referring now more particularly to the accompanying drawing, the numeral 5 designates an electromagnetic chuck of any conventional design having a coil 6 provided with terminals 7 and 8. These terminals are adapted to have the output leads 9 and 10 of the combined magnetizing and demagnetizing unit connected thereto as by means of a conventional plug and socket.

The unit is equipped with a main power switch 11 whereby the primaries of two transformers 12 and 13 may be connected with the A. C. supply line, and a selector switch 14 by which the unit is set to supply either a direct magnetizing current or an alternating demagnetizing current. While for convenience of illustration two separate transformers (12 and 13) have been shown, it is, of course, understood that one integral transformer could be substituted for the two. The secondary of the transformer 12 supplies alternating current of suitably high voltage to the input terminals of a selenium rectifier bridge 16. The D. C. output of this rectifier network is fed to the coil of the chuck or other electromagnet to be energized through a control rheostat 17. With the selector switch 14 in its "magnetize" position, two electromagnetically responsive control switches 18 and 19 controlled thereby are in their normal de-energized positions, completing the circuit from the rheostat 17 to the coil 6 of the chuck, it being understood that one side of this circuit is provided by ground.

This magnetizing circuit may be traced from the rheostat 17 along conductor 20 through switch contactor 21, conductor 22, switch contactor 23 and output lead 9 to the terminal 7 of the chuck coil. The other chuck terminal 8 is connected to ground through the output lead 10, switch contactor 24 and a ground lead 25. To indicate that the unit is in its magnetizing condition a pilot light 26 is provided and energized as long as the magnetizing circuit is closed. Current for this pilot light is supplied by connecting it between conductor 22 and ground through a suitable current limiting resistance.

The transformer 13, which is energized concomitantly with the transformer 12 by closure of the main power switch 11, has a tapped secondary 27 providing plate current for a pair of high vacuum hot cathode rectifier tubes 28 (which may be the conventional 5U4G tubes) and a separate low voltage secondary section 29 providing filament voltage for the cathodes of these tubes. The cathode circuit may be traced along conductor 30 which leads from one terminal of the secondary section 29 and connects with one side of each of the two cathodes, conductor 31, switch contactor 32 and conductor 33 back to the other side of the secondary section 29. Accordingly, during the time that the chuck is being magnetized the cathodes of the two rectifier tubes which together provide full wave rectification are connected in circuit to render the tubes conductive and ready to supply demagnetizing current the instant the selector switch 14 is moved to its "demagnetize" position. Such actuation of the switch 14 closes its three contactors 34, 35 and 36.

Since the center tap of the transformer secondary 27 is grounded, the closure of the contactor 35 which is connected to a relatively low voltage tap of the secondary, effects energization of the solenoid 37 of the switch 18 to bring its contactors 21 and 32 to their opposite positions. The energizing circuit for the solenoid 37 beginning with contactor 35 may be traced along conductor 38, conductor 39 to one side of the solenoid and from the other side thereof to ground through a conductor 40 and the conductor 25. As will be clear from the drawing the closure of the contactor 35 also starts a timing motor 41 by which a switch 42 is periodically closed to energize the solenoid 43 of the polarity changing switch 19 and thereby effect regular periodic reversals of the position of this switch. These reversals preferably should occur approximately thirty times per minute.

The circuit for energizing the solenoid 43, beginning with conductor 38, continues along a conductor 44 to one side of the switch 42, from the other side thereof to one terminal of the solenoid and from the other side of the solenoid to ground through conductor 25.

As the position of the switch 18 changes in response to energization of its solenoid 37 its contactor 32 opens the cathode circuit and connects a pilot light 45 across the low voltage secondary section 29, and its contactor 21 opens the magnetizing circuit and closes a demagnetizing circuit to be described. With the opening of the cathode circuit the tubes begin to cool and gradually reduce the current they supply to the demagnetizing circuit. If ordinary 5U4G tubes are employed the cooling period is approximately seven to ten seconds. Energization of the pilot light 45 indicates that the manual selector switch 14 has been moved to its "demagnetize" position and also that the electromagnetic switch 18 has responded.

Since the tubes 28 together constitute a full wave rectifier one or the other is conductive as long as their temperatures remain above the critical point. The demagnetizing circuit thus extends either from the switch contactor 34 which is connected with a high voltage tap at one side of the grounded center tap or the contactor 36 connected to a like high voltage tap at the other side of the grounded center tap, through one or the other of the two tubes, from the cathode of the then conducting tube, conductor 31, a resistor 48, contactor 21, conductor 22, contactor 23, and output lead 9 to one terminal 7 of the chuck coil. From the other terminal 8 of the chuck coil the circuit is completed through the output lead 10, contactor 24, and conductor 25 to ground.

With energization of the solenoid 43 by closure of the clock controlled switch 42 the contactors 23 and 24 leave one set of contacts of the polarity changing switch 19 and engage the other set of contacts to reverse the polarity of the current fed to the chuck coil from the tubes. During the interval the contactors change position and the coil of the chuck is disconnected from the rectifier tubes, a capacitor or condenser 49 so connected in the circuit as to be shunted directly across the coil in series circuit with a resistor 50 will be charged by the back E. M. F. which flows in this shunt circuit as a result of collapse of the flux therein. The charge thus produced in the capacitor 49 will augment the demagnetizing current delivered by the rectifier tubes as the contactors 23 and 24 assume their new positions and reclose the demagnetizing circuit since the polarity of both voltage sources will be the same. It is to be understood that since the condenser is in series with coil 6 whenever the contactors 23 and 24 are traveling between their sets of contacts, the travel time of the contactors from one set of contacts to the other must be so related to the natural oscillating frequency of the inductance of the coil 6 and the capacitance of condenser 49 that the contactors are brought into engagement with one set or the other of their contacts at about the time the condenser reaches maximum charge by the back E. M. F. of the coil. About one quarter cycle of oscillation should occur between the time the contactors leave one set of contacts and come into engagement with the other set thereof.

The resistor 50 has a value such as to assure the necessary delay in the charging of the condenser by collapse of the flux in the coil 6 during the time the contactors of the reversing switch change positions, whereby the contactors are brought into engagement with one set or the other of the contacts at about the same time that the condenser becomes charged.

The charge thus built up in the condenser by the back E. M. F. of the coil is of opposite polarity from the direct current impulse which flowed into the electromagnet directly before the polarity changing switch disconnected the terminals from the rectifiers so that upon reclosure of the polarity changing switch the charge of the condenser is of the same polarity as the next direct current impulse flowing from the rectifier to the electromagnet so as to augment said impulse. The current impressed upon the coil of the chuck thus will be the sum of the current produced by the rectifier tube and the current represented by the charge on the capacitor or condenser 49.

During the next reversal of the polarity changing switch the capacitor is again charged to be discharged along with the succeeding delivery of demagnetizing current by the rectifier tubes. This sequence of operations continues throughout the entire interval that the tubes are conductive and during this interval the demagnetizing current supplied to the chuck coil not only gradually diminishes to zero, but by virtue of the presence of the capacitor or condenser 49 in the circuit, at least once reaches the value necessary to effect reversal of the residual flux in the electromagnet of the chuck and thereby produce complete demagnetization of the chuck and any part held thereby without requiring the rectifier tubes to deliver the full demagnetizing current.

It will be noted that the pilot light 26 which as previously described signifies that the unit is set on "magnetize" is also in the circuit during the demagnetizing cycle but goes out when this cycle is complete, thus by its extinction indicating the completion of the demagnetizing cycle.

Excessive voltage surges during the demagnetizing cycle, which if not properly suppressed would cause ionization of the high vacuum rectifier tubes and thus cause the tubes to act as cold cathode rectifiers, are prevented by the resistor 48 connected in series with the output of the tubes.

Arcing at the contacts of the polarity changing switch 19 is suppressed by a condenser 51 connected across the power supply represented by the conductor 22 and ground, the condenser being connected in series with a suitable resistance 52.

For purposes of illustration but not limitation, in a unit designed to demagnetize a 300 watt load, a pair of 5U4G tubes and a 6 mfd. condenser will supply all the voltage and current needed. A unit of the type described designed for operation with a 300 watt chuck delivers a total direct current output of approximately 400 mils. The average D. C. current measured at the plates of the rectifier tubes is approximately 190 mils. However, the current required to demagnetize a 300 watt chuck is approximately 1000 mils, thus the remainder of the output is supplied by the condenser 49. It is understood that these are instantaneous peak values and that the figures would vary somewhat with different type tubes, resistors, condensers and chucks.

Those skilled in the art will recognize that the invention puts to useful effect an inherent condition which in the past has been considered highly objectionable, for with this invention the back E. M. F. which results from the voltage induced in the coils of the magnetic chuck during the intervals when the polarity changing switch moves from one position to the other is employed to augment the primary current derived from the rectifier tubes. It is this fact which enables the reduction of the number of tubes.

In addition the condenser which the back E. M. F. charges also helps reduce the arcing at the contacts of the polarity changing switch and thus greatly minimizes the servicing of the unit.

The important observation is that with this invention and specifically by virtue of the condenser 49 connected in the manner in which it is across the output of the demagnetizing circuit, it is possible to effect complete demagnetization of an electromagnet with a single pair of rectifier tubes arranged to provide full wave rectification despite the fact that the electromagnet had been energized with voltage and current far in excess of that which could be delivered by two such tubes, and that as a result it becomes advantageous and feasible to combine a selenium type rectifier for producing the magnetizing current with a tube type rectifier for producing the demagnetizing current. In other words, the invention makes possible a simple, relatively inexpensive unit by which large capacity chucks can be magnetized and also demagnetized.

What I claim as my invention is:

1. A magnetizing and demagnetizing unit for magnetizing and demagnetizing an electromagnet, comprising: a dry plate type rectifier providing a source of high voltage direct current; a high vacuum-hot cathode tube type rectifier providing another source of direct current; output terminals for the unit adapted to be connected with an electromagnet to be magnetized and demagnetized; circuit means for connecting either source of direct current with said output terminals, including a manually operable selector switch controlling the cathode circuit of the tube type rectifier and whereby the cathode circuit is closed when the dry plate type rectifier is operatively connected with the output terminals and open when the tube type rectifier is operatively connected with the output terminals, said circuit also including a polarity changing switch operable to change the polarity of the output terminals of the unit; automatic means for periodically actuating the polarity changing switch, said automatic means being connected in circuit to be operative only when the selector switch is in its "demagnetize" position operatively connecting the tube type rectifier with the output terminals of the unit; and a condenser connected across the output terminals of the unit between the polarity changing switch and the terminals to discharge into an electromagnet connected to said output terminals along with the current supplied by the tube type rectifier and thus augment the impulse produced by said rectifier and to be recharged by the back E. M. F. in the electromagnet coil during the intervals the polarity changing switch moves from one position to the other.

2. In an apparatus for magnetizing and demagnetizing an electromagnet, the combination of: a hot cathode tube type rectifier providing a source of direct current; a selenium type rectifier providing another source of direct current of greater magnitude than said first source; output terminals for the unit; circuit means for connecting either of said sources of direct current with the output terminals whereby the larger current obtained from the selenium type rectifier may be used for magnetizing a load connected across said output terminals and the current delivered by the tube type rectifier may be used for demagnetizing purposes, said circuit including selector switch means for operatively connecting either of said two sources of direct current with the output terminals and for controlling the cathode circuit for the tube type rectifier to close said cathode circuit when the selenium type rectifier is connected with the output terminals and to open said circuit when the tube type rectifier is connected with the terminals; a polarity changing switch connected between the output terminals and said two sources of direct current; an actuator for said polarity changing switch; circuit means connected with the actuator and the selector switch for rendering said actuator operative only when the selector switch is in its position connecting the tube type rectifier with the output terminals of the unit; and a capacitor connected across said output terminals of the unit between the polarity changing switch and the terminals to be charged by the direct current flowing to the electromagnet from the selenium type rectifier and to discharge into the electromagnet along with the initial demagnetizing impulse from the tube type rectifier as the polarity changing switch disconnects the terminals of the unit from the tube type rectifier and be recharged with a voltage of opposite polarity by the back E. M. F. in the electromagnet by the time the polarity changing switch reconnects the output terminals with the tube type rectifier so that the diminishing impulses from the tube type rectifier are always augmented by the discharge of the capacitor.

3. A demagnetizing unit for dissipating residual magnetism in a magnetic chuck and a part held thereby, comprising: a pair of output terminals connectible with the chuck to be demagnetized; a hot cathode high vacuum tube type rectifier which remains conductive as long as the temperature of its cathode is above a predetermined value and gradually conducts less current as the tube cools; manually controlled means for energizing the cathode of the tube type rectifier so that it may be brought to said predetermined temperature prior to initiation of the demagnetizing cycle; circuit means for connecting the output of the rectifier with the output terminals of the unit, including automatic switch means for successively changing the polarity of said output terminals at a predetermined uniform rate; common switch means for connecting the tube type rectifier with the output terminals, for initiating the operation of the automatic polarity changing switch means, and for disconnecting the cathode of the tube type rectifier from its energizing source to thereby initiate the demagnetizing cycle, the length of which is dependent upon the time required for the cathode to cool; and a condenser connected across the output terminals of the unit to be charged by the back E. M. F. produced by the voltage induced in the coils of an electromagnet connected across the output terminals during the interval the polarity changing switch moves from one position to the other, the charge thus built up in the condenser being of opposite polarity from the direct current impulse which flowed into the electromagnet directly before the polarity changing switch disconnected the terminals from the rectifier so that upon reclosure of the polarity changing switch the charge on the condenser is of the same polarity as the next direct current impulse flowing from the rectifier so as to augment said impulse.

4. A demagnetizing unit for dissipating residual magnetism in a magnetic chuck and a part held thereby, comprising: a pair of output terminals connectible with the chuck to be demagnetized; a hot cathode high vacuum tube type rectifier which remains conductive as long as the temperature of its cathode is above a predetermined value and gradually conducts less current as the tube cools; manually controlled means for energizing the cathode of the tube type rectifier so that it may be brought to said predetermined temperature prior to initiation of the demagnetizing cycle and disconnected from its energizing source at the start of the demagnetizing cycle; circuit means for connecting the output of the rectifier with the output terminals of the unit, including automatic switch means for successively changing the polarity of said output terminals at a predetermined uniform rate; a condenser connected across the output terminals of the unit to be charged by the back E. M. F. produced by the voltage induced in the coils of an electromagnet connected across the output terminals during the intervals the polarity changing switch moves from one position to the other, the charge thus built up in the condenser being of opposite polarity from the direct current impulse which flowed into the electromagnet directly before the polarity changing switch disconnected the terminals from the rectifier so that upon reclosure of the polarity changing switch the charge on the condenser is of the same polarity as the next direct current impulse flowing from the rectifier so as to augment said impulse; and a resistor connected in series with said condenser for synchronizing its rate of charge and discharge with the reversal of the polarity changing switch.

5. The demagnetizing unit of claim 4 further characterized by a resistor connected between the rectifier output and polarity changing switch for suppressing voltage peaks and preventing them from ionizing the rectifier tube.

6. A magnetizing and demagnetizing unit comprising the combination of: a selenium type rectifier providing a source of high voltage direct current; a hot cathode tube type full wave rectifier providing a source of direct current of less current than that delivered by the selenium type rectifier; output terminals for the unit to which a load to be magnetized or demagnetized may be connected; circuit means for operatively connecting either of said two rectifiers with the output terminals; an automatic polarity changing switch operable to periodically reverse the polarity of the output terminals; circuit means connecting the polarity changing switch between the output terminals and the tube type rectifier when the latter is operatively connected with the terminals; and a condenser at all times connecetd across the output terminals to discharge into a load with which the terminals are connected in synchronization with reversal of the polarity changing switch.

References Cited in the file of this patent

UNITED STATES PATENTS

| | | |
|---|---|---|
| Re. 23,217 | Snyder | Apr. 4, 1950 |
| 2,240,749 | Beechlyn | May 6, 1941 |
| 2,347,369 | Roters | Apr. 25, 1944 |
| 2,632,035 | Jaeger | Mar. 17, 1953 |

FOREIGN PATENTS

| | | |
|---|---|---|
| 882,033 | France | May 14, 1943 |